April 7, 1964

W. C. BURT 3,127,707

RECIPROCATING WORK HOLDER

Filed May 25, 1962

2 Sheets-Sheet 1

Fig. 1.

INVENTOR.
WILLIAM C. BURT

BY Bean, Brooks, Buckley + Bean
ATTORNEYS

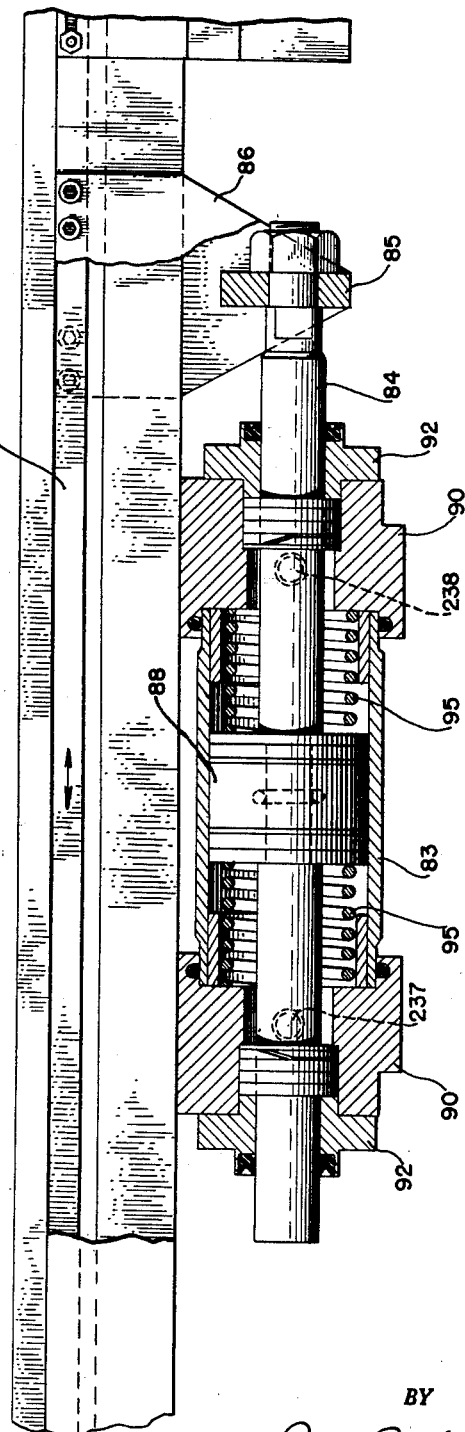

3,127,707
RECIPROCATING WORK HOLDER
William C. Burt, Olean, N.Y., assignor to Clair Manufacturing Co., Inc., Olean, N.Y.
Filed May 25, 1962, Ser. No. 197,756
6 Claims. (Cl. 51—83)

This invention relates to surface finishing machines of the type known as glazing and polishing machines, and more particularly to machines such as are used for glazing and polishing multiple lots of cutlery articles, tools, hardware, and the like. Furthermore, the present invention relates to machines such as are disclosed in my prior United States Patent No. 2,612,005, and embodies improvements thereover whereby such machines may be more efficient in their operation.

One of the objects of the present invention is to provide a machine for polishing and glazing articles as aforesaid, which embodies an improved work holder reciprocation action. Another object of the invention is to provide an improved machine for the purposes aforesaid, embodying improved stroke control means for the workpiece holder relative to the glazing or polishing rolls, whereby the workpieces are shifted relative to the polishing or glazing rolls in improved manner. Another object of the invention is to provide an improved machine as aforesaid, whereby the workpieces are automatically motivated relative to the machine rolls during each operative cycle in improved manner. Other objects and advantages of the invention will appear in the specification hereinafter.

In the drawings:

FIG. 1 is a fragmentary front elevational view of a polishing or glazing machine constructed in accordance with the invention; and FIG. 2 is a fragmentary sectional detail of a portion of FIG. 1.

The drawing illustrates the invention as being employed in conjunction with a machine such as is shown in my prior Patent No. 2,612,005; the present invention providing an operative mechanisms which may be embodied for example in a machine assembly as disclosed in the aforesaid patent as an accessory thereto so as to provide an improved automatic control thereof. Thus, as illustrated in FIG. 1, for example, a machine incorporating the invention may generally include a base or frame 10 supported by legs 12 to convenient height; frame 10 in turn supporting an oscillating workpiece carriage and polishing or glazing rolls, and other mechanisms for driving and controlling the carriage and the rolls as will be explained hereinafter.

The rolls are indicated at 14—16; the roll 14 being mounted above the roll 16, and the rolls are arranged to contact along the line of entering of the ware to be polished or glazed. The rolls 14—16 are carried upon shafts such as shown at 18, and will of course be formed of any suitable material treated in any desired manner according to the character of the work to be done. The rolls 14, 16 are arranged to be driven by any suitable means such as for example by separate electric motors as shown and described in Patent No. 2,458,708.

The work mounting carriage portion of the machine is illustrated herein to comprise a table 70 which is mounted upon the base plate 10 by means of slideways 72 so that the table 70 is reciprocable horizontally in directions transverse to the rolls 14, 16. A hydraulic piston-cylinder unit 75 or the like is mounted under the base plate 10, and the piston rod thereof extends into connection with a bracket 77 carried by the platform 70. Thus, hydraulic actuation of the piston-cylinder unit 75 will cause the platform 70 to reciprocate toward and away from the rolls 14, 16.

A second platform 80 is mounted by means of bearings 82 (FIG. 1) which are carried by upright extensions of the platform 70 so that the platform 80 is reciprocable relative to the platform 70 in directions axially of the rolls 14, 16 independently of reciprocation of the platform 70. A piston-cylinder unit 83 is mounted upon the platform 70, and the piston rod 84 thereof is connected as shown at 85 to an arm 86 integral with the platform 80, whereby actuation of the piston cylinder unit 83 will cause the platform 80 to reciprocate in sidewise directions independently of backward and forward reciprocations of the platform 70.

The platform structure 80 includes means to receive in slide-fitting relation therein a work carrying bracket 124. Thus, a gang of spoons or forks or the like may be clamped upon the bracket, as by means of a detachable holder bar, so that the workpieces are mounted to extend therefrom toward the rolls 14, 16 of the machine which rotate in such directions as to at all times tend to draw the workpieces into the polishing gap.

As disclosed in prior Patent 2,612,005, control for sidewise reciprocation of the work carriage is effected by a hydraulic cylinder designated 83. In the case of my present invention a corresponding cylinder is similarly designated 83 in the drawing herewith, with a view to clarification and simplification of the description of the present invention. In the case of the prior patent, the cylinder 83 was hydraulically actuated and controlled as illustrated by FIGS. 6, 8, of the patent and as explained in the accompanying specification, so as to reciprocate the workpiece carriage under control of a shuttle valve 235 which in turn was controlled by a work carriage-tripped pilot valve 236 (FIGS. 1, 6, 8 of the patent). However, in the case of the present invention only a pilot valve is required, and at FIG. 1 of the drawing herewith the pilot valve component is designated by corresponding numeral 236, and a manual screw adjustment for the pilot valve is similarly indicated at 254. Thus it will be appreciated that reciprocation of the work holding carriage will alternately rock the armature of the valve 236 back and forth so as to deliver power to opposite sides of the piston in the cylinder 83, thus causing constantly reversing reciprocations of the work carriage.

Furthermore, in the case of the present invention the actuating cylinder 83 embodies operative components of totally different form to provide a new and improved operative effect. The piston rod 84 carries a centrally positioned piston 88, and the opposite ends of the cylinder 83 are fitted with heads 90—90 which in turn carry bushing and seal devices 92—92 for fluid-sealing of the rod 84 at opposite ends of the cylinder structure. Compression springs 95—95 are mounted within the cylinder to bear against opposite sides of the piston 88, and to bottom against the corresponding end closures 90—90, thereby providing an automatic elastic restraint effect against piston motion in either direction.

As in the case of my prior patent, the power supply system for the cylinder 83 connects to opposite ends of the cylinder by means of conduits which are similarly designated 237, 238, respectively; but in lieu of hydraulic fluid the system of the present invention employs compressed air. Hence, the piston 88 is motivated to displace back and forth under the influence of an elastic fluid pressure medium, and against the elastic restraint and cushioning effects of the springs 95—95. It is this combination of operative elements that provides the reciprocating workpiece carriage with an improved action. A simple hydraulic piston-cylinder unit in this situation would invariably provide an action both hard and slow. A simple pneumatic piston-cylinder arrangement would be too "jumpy," and would provide a relatively uncontrolled type action and would result in undesirable override, and an otherwise generally undesirable and uncontrolled type of action.

On the other hand, in the case of the present invention, the combination of pneumatic pressure power and spring restraint effects provides an improved control of the carriage motion as well as a tremendously increased rate of carriage reciprocation. The kinetic energy of the carriage motion in one direction becomes absorbed and stored into the restraining spring element, which energy becomes subsequently released (upon reversal of the control valve action) to immediately contribute to boost the rebound stroke of the mechanism. Thus, each motion of the carriage is reversed wtih an improved "snap action" which substantially eliminates the undesirable "dwell" at each end of the carriage travel, such as is experienced with carriage actuator systems of the prior art.

Control of the rebound boost of the system is readily effected by simple screw driver adjustments of the needle valve devices of the valve units 235, 236. Control of the length of the carriage stroke is readily effected by manual adjustments of the screw handle 254, which operates to shift the valve trip blocks 250—250, as explained in greater detail in my early patent referred to hereinabove.

Thus, it will be appreciated that the present invention provides a carriage reciprocation control system which not only desirably increases the carriage reciprocation rate, but also practically eliminates the previously present and highly undesirable "dwell" action of the carriage at each end of its stroke. Also, it will be appreciated that the mechanism of the invention is simple and rugged in design, and relatively inexpensive to manufacture and manitain; and that although only one specific form of the invention has been illustrated and described in detail hereinabove, it will be understood that various changes may be made therein without departing from the spirit of the invention or the scope of the following claims.

I claim:

1. In a polishing and glazing machine having in combination, a pair of rolls, a work platform and means for causing said platform to oscillate in directions parallel to said rolls, the improvement comprising a pneumatic cylinder having a piston rod extending therefrom for causing said platform to oscillate and carrying a piston disposed within said cylinder, compression springs mounted within said cylinder at opposite ends thereof and bearing in opposition against said piston, and a reciprocation control device comprising valve means actuated by motions of said platform for directing pneumatic pressure forces alternatively against opposite sides of said piston and in opposition to the elastic restraint forces of said springs.

2. In a polishing and glazing machine having in combination a pair of rolls, a slide member movable towards and away from the rolls in directions at right angles to the longitudinal axes of the rolls, a work platform carried by said slide member and movable thereon in directions parallel to said rolls, and means for causing said slide member and said platform to independently oscillate, the improvement of means for causing said platform to oscillate comprising a pneumatic cylinder having a piston rod extending therein and carrying a piston centrally thereof, compression springs mounted within said cylinder at opposite ends thereof and bearing in opposition against said piston, and a reciprocation control device for said means comprising a two-position valve actuated by motions of said platform to opposite ends of the prescribed stroke thereof to alternately operative positions of said valve for directing pneumatic pressure forces alternatively against opposite sides of said piston and against the elastic restraint forces of said springs.

3. In a polishing and glazing machine having in combination, a pair of rolls, a slide member movable towards and away from the rolls in a line at right angles to the longitudinal axes of the rolls, a work platform carried by said slide member and movable thereon in directions parallel to said rolls, and means for causing said slide member and said platform to independently oscillate, the improvement comprising a pneumatic cylinder for causing said platform to oscillate and having a piston rod extending therefrom, compression springs bearing in longitudinal opposition against said piston rod, and a reciprocation control device comprising valve means actuated by stroke motions of said platform to direct pneumatic pressure forces alternatively operable to cause reciprocation of said piston rod and in opposition to the elastic restraint forces of said springs.

4. In a buffing machine having in combination, a buffing roll, a work platform and means for causing said platform to oscillate in directions parallel to said roll, the improvement comprising a pneumatic cylinder having a piston rod extending therefrom for causing said platform to oscillate and carrying a piston disposed within said cylinder, compression springs mounted within said cylinder at opposite ends thereof and bearing in opposition against said piston, and a reciprocation control device comprising valve means actuated by motions of said platform for directing pneumatic pressure forces alternatively against opposite sides of said piston and in opposition to the elastic restraint forces of said springs.

5. In a polishing and glazing machine having in combination, a workpiece processing roll, a work platform and a pneumatic jack having an output member connected to said platform for causing said platform to oscillate in directions parallel to said roll, spring means connected to said jack output member and arranged to oppose motions thereof in both directions, and a reciprocation control device comprising valve means actuated by motions of said platform for directing pneumatic pressure forces into said pneumatic jack for alternatively moving said output member in opposite directions and in opposition to the elastic restraint forces of said spring means.

6. In a polishing and glazing machine having in combination, a workpiece processing roll, a work platform and power means having an output member connected to said platform for causing said platform to oscillate in directions parallel to said roll, said power means comprising pneumatic pressure operated device applying pneumatic pressure forces alternatively moving said output member in opposite directions, and elastic restraint means connected to said output member and arranged to elastically restrain motions thereof in both directions.

References Cited in the file of this patent
UNITED STATES PATENTS

| | | |
|---|---|---|
| 1,242,474 | Riley | Oct. 9, 1917 |
| 2,346,820 | Casler et al. | Apr. 18, 1944 |
| 2,610,613 | Bryant | Sept. 16, 1952 |
| 2,612,005 | Burt | Sept. 30, 1952 |
| 2,795,086 | Clark | June 11, 1957 |
| 2,920,425 | Oathout | Jan. 12, 1960 |